(12) United States Patent
Marshall

(10) Patent No.: US 8,985,654 B2
(45) Date of Patent: Mar. 24, 2015

(54) HANDLE FOR LIFTING AND TRANSPORTING FOOD PANS

(71) Applicant: Chris Hext Marshall, Stillwater Lake (CA)

(72) Inventor: Chris Hext Marshall, Stillwater Lake (CA)

(73) Assignee: Chris Marshall, Stillwater Lake, Nova Scotia (CA)

( * ) Notice: Subject to any disclaimer, the term of this patent is extended or adjusted under 35 U.S.C. 154(b) by 0 days.

(21) Appl. No.: 13/846,735

(22) Filed: Mar. 18, 2013

(65) Prior Publication Data

US 2013/0249226 A1 Sep. 26, 2013

(51) Int. Cl.
*A47J 45/10* (2006.01)

(52) U.S. Cl.
CPC .................................. *A47J 45/10* (2013.01)
USPC ................ 294/34; 294/16; 294/33; 294/166

(58) Field of Classification Search
USPC ............. 294/16, 27.1, 33, 34, 166, 119.1; 16/425; 220/212.5, 213, 214, 318, 324, 220/759, 764; 292/258, 113
See application file for complete search history.

(56) References Cited

U.S. PATENT DOCUMENTS

| | | | | |
|---|---|---|---|---|
| 1,034,233 A | * | 7/1912 | Haynes | 220/212.5 |
| 1,641,681 A | * | 9/1927 | Kircher | 220/324 |
| 1,698,928 A | * | 1/1929 | Wentorf | 292/113 |
| 1,769,696 A | * | 7/1930 | Kocher | 292/258 |
| 2,093,658 A | * | 9/1937 | Hildenbrand | 294/34 |
| 2,717,171 A | * | 9/1955 | Gottstein | 294/166 |
| 3,262,728 A | * | 7/1966 | Atterbury | 294/16 |
| 3,827,742 A | * | 8/1974 | Holden | 294/16 |
| 6,494,337 B1 | * | 12/2002 | Moroni | 220/314 |
| 6,547,296 B1 | * | 4/2003 | Perkitny et al. | 294/16 |
| 8,544,909 B2 | * | 10/2013 | Martin et al. | 294/16 |
| 2008/0290092 A1 | * | 11/2008 | de Bastos Reis Portugal et al. | 220/321 |
| 2012/0132652 A1 | * | 5/2012 | Barber | 220/212.5 |
| 2012/0286530 A1 | * | 11/2012 | Martin et al. | 294/116 |
| 2013/0098921 A1 | * | 4/2013 | Yang et al. | 220/324 |

* cited by examiner

*Primary Examiner* — Paul T Chin

(57) ABSTRACT

The invention described herein is a removable lifting and transporting pan handle that is used to lift and transport individual food pans, sometimes called chafing dishes or steam pans, as commonly used in restaurants. In performing these functions it does four things: it provides a sharp edge on the front of two lifting claws to wedge and slide between the food pan lip and the warming well to facilitate the food pan's removal from the well, it provides a mechanism to secure the food pan lid to the food pan to minimize food leakage and heat dissipation during transport, it provides a lifting/transporting handle that is clamped to the food pan for lifting and/or transporting the food pan and lid combination and it provides a mechanism for releasing the food pan and lid combination once transport is complete. It can be used on food pans that are full of food, partially full of food or empty.

6 Claims, 5 Drawing Sheets

HANDLE FOR LIFTING AND TRANSPORTING FOOD PANS

BACKGROUND AND SUMMARY OF THE INVENTION

A. Field of the Invention

The invention relates generally to commercial kitchen utensils. More particularly, the present invention relates to the transporting of food serving pans, sometimes called chafing dishes or steam pans, commonly used in restaurants. In particular, it relates to an efficient, hygienic and safe method of lifting and transporting these food pans.

B. Background of the Invention

In the commercial food industry the use of rectangular food pans, sometimes called chafing dishes or steam pans, is commonplace. These food pans are designed to be used in conjunction with a steam table, which is a shallow tank usually containing hot water circulating below with standard sized holes cut into the top surface where the food pans are placed. These tanks with pan holes are sometimes called warming wells. The food pan is designed to fit into the warming well where the edges of the food pan rest on the edges of the well so as to support the weight of the pan at a height such that the bottom of the food pan is immersed in the hot water below. The warming well is normally of a standard size so that the food pans, also of standard sizes, can be used. The food pan sizes range typically from full-sized pans which fill the entire warming well, to smaller sizes that are typically ½, ⅓, or ⅙ of the size of the full-sized pan so that 2, 3 or 6 pans respectively can fit into a single standard-sized warming well.

The lifting and transporting of these food pans, can be difficult and potentially dangerous, particularly when they contain hot foods. These dangers include, but are not limited to the following hazards:

1. The edges of the pans are often hot and if the person attempting to transport them is not using a towel or oven mitts they can burn their hands. Sometimes the edges of the pan are not hot when the transport begins, such as shortly after the food is added, but the heat from the food typically propagates through the pan increasing the temperature of the edges during the course of the transport. If this happens, the edges can become too hot to hold and the pan is sometimes dropped creating additional hazards associated with the spilling of hot foods.
2. When the pans are residing in a steam table, sharp objects are often used to pry up the edge of the pan from the steam table surface in order to help remove it. During this operation the person can be injured if the sharp object slips.
3. When the food pan is being lifted from the warming well there is often a rush of steam through the opening between the pan and the well. This rush of steam can scald the person's hands which are next to the opening.
4. If the contents of the food pan slosh around during transport they can slosh over the edge of the pan onto the persons hands causing burns. The tendency for the contents to slosh with movement is aggravated by the fact the food pan is supported by the pan edges rather than a point above the pan. It is known that the higher the lifting point relative to the edges of the pan the more stable the transport, the less the tendency there is for the contents to slosh around.
5. When using towels or oven mitts to hold the edges of the pan it is easy for the towel or mitt to come into contact with the food creating a contamination hazard.

SUMMARY OF THE INVENTION

The invention described herein provides a device for lifting and transporting these food pans to or from warming wells or other locations. It provides the user with a means to secure the food pan to the lid, lift the pan and lid (complete with contents) and transport the entirety to the destination. The transporting can be initiated from, or terminated at, a warming well where the device can either assist in lifting the pan out of the warming well or deposit the pan into the warming well. All this can be done without the need of the user to touch the food pan or the warming well thus providing a means of transport that minimizes the potential for personal harm associated with these activities, and minimizes the potential for food contamination associated with the use of oven mitts or similar heat protection tools. The device can be used either by itself as a one-handed unit on small pans (such as "⅙ size", "⅓ size" or "½ size" food pans) or two at a time on the larger, full-sized food pans where they can be employed to provide lifting handles for both hands. There are currently no such commercially available devices known that fully address these issues.

DESCRIPTION OF THE RELATED ART

There are designs of pan lifting devices that address some issues but none that address all of the transporting problems described in the Background. For example, U.S. Pat. No. 5,462,237 describes a device intended to help remove a pan from the steam table and provide a means of transport. It is comprised of a handle joining two sharpened plates that slide under opposite edges of the pan to assist lifting it out of the steam table but the device does not provide any mechanism for either securing the lid onto the pan or preventing the pan from sliding off the device during transport. The device also requires that it be inserted from one side of the pan and can be problematic if there are obstacles, including other pans, in front of the targeted pan.

There is another design, U.S. Pat. No. 6,092,670 that provides a partial solution to the problems described in the Background. This device is essentially two triangular straining plates that attach to opposite corners of the pan and provide handles for lifting and manipulating the pan. This device, however, does not enable the pan lid to be secured and, therefore, does not protect the user from heat rising from the food or from food itself which may slosh during transport. It also does not provide a positive locking mechanism to secure the handles to the pan and requires the user to use two hands to operate regardless of the size of the pan.

There is another design, U.S. Pat. No. 3,179,287 that provides a partial solution to the problems described in the Background. This device, in its most comparable form, includes a pair of handles that insert under opposite pan edges thus enabling the user to remove the pan without touching either the pan or the surface of the steam table. This device can be used on different sized pans but requires the user to always use both hands, regardless of pan size. In addition, because the handles do not lock in place, the assemblage is more susceptible to wobbly transport and subsequent sloshing of the contents of the pan. In the version that secures the lid in place, the pan and lid must be modified or provided with special lifting hooks and latches that are not normally included in industry standard pans/lids.

Another design providing some solutions to the problems described in the Background are described in U.S. Pat. No. 3,112,948. This design consists of two steel plates bent to fit onto opposite edges of a pan thus providing lifting handles. The shape of the bends in the plate, however, must be very specific and do not lend themselves well for different shaped pan edges. In addition, the method of attachment of these handles makes them susceptible to unclipping themselves in situations where the pan is heavy. They also do not provide a mechanism for securing the pan lid.

Another design which addresses some of the problems listed in the Background is described in U.S. Pat. No. 3,262,728. This design is essentially a handle with a hook on each end designed to hook onto the edge of a pan. It is designed to be attached/detached by pressing on a tab which spreads one of the hooks. This device, however, has several disadvantages: it does not lock onto the pan firmly and the spring action of the hook must be overcome by the user without the aid of any mechanical advantage, thus limiting the amount clamping force available. Also, the device is not designed to be used with the lid in place and the effective use of the unit may be limited by the shape of the pan edge.

Another design which addresses some of the problems listed in the Background is described in U.S. Pat. No. 3,333,882. This design is essentially a handle with a pivoting hook on each end and a flexible joiner between the two ends which are attached below the pivot points. The joining member flexes when lifted thus pulling the end hooks together and grasping the pan edges. It normally rests in the open position and only closes when the user pulls up on the flexible joiner during the lifting operation. This device, however, has the disadvantage of not being able to be independently secured to the pan as it requires the user to constantly pull on the joining member to prevent it from disengaging.

DETAILED DESCRIPTION

Figure 3:
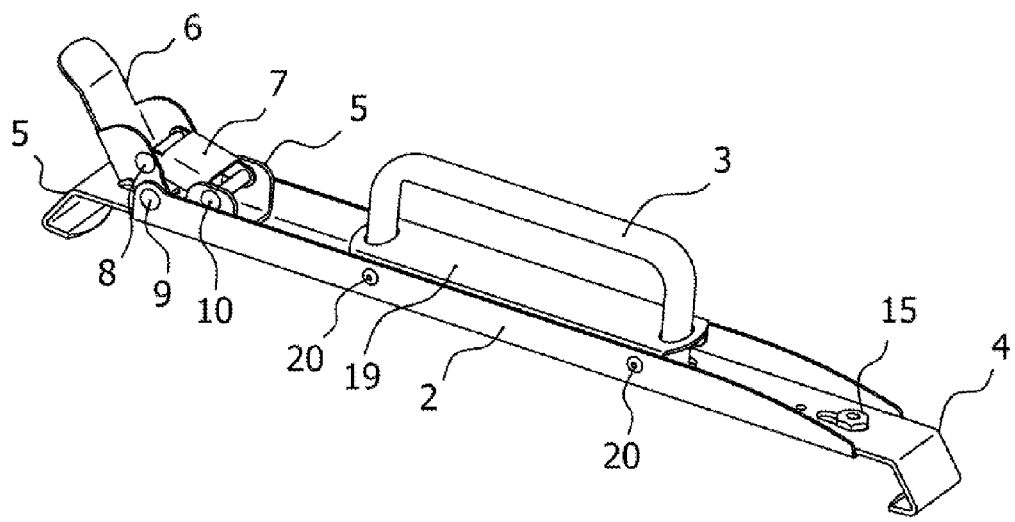
FIG. 3 is a view of the handle mechanism and its components.

In accordance with the present invention, the pan handle invention (1) is based on four main functional components and assemblies as shown in FIG. 3: the chassis (2), the lifting handle (3), the spring-loaded lifting claw (4) and the latched lifting claw (5). The lifting handle (3) is firmly attached to the chassis (2) which spans nearly the entire the length of the pan handle invention and provides the main support structure of the device. The lifting handle (3) is positioned in the approximate center of the device such that when a pan/lid combination is being lifted with the device, the complete assembly remains in approximately the horizontal orientation.

Figure 1:
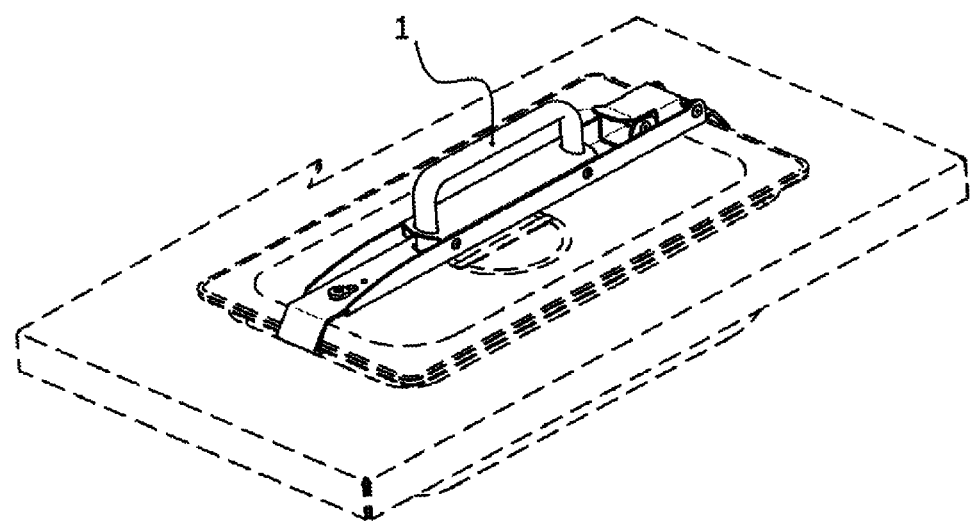
FIG. 1 is a view of the pan handle invention lifting a food pan out of a warming well.
Figure 2:
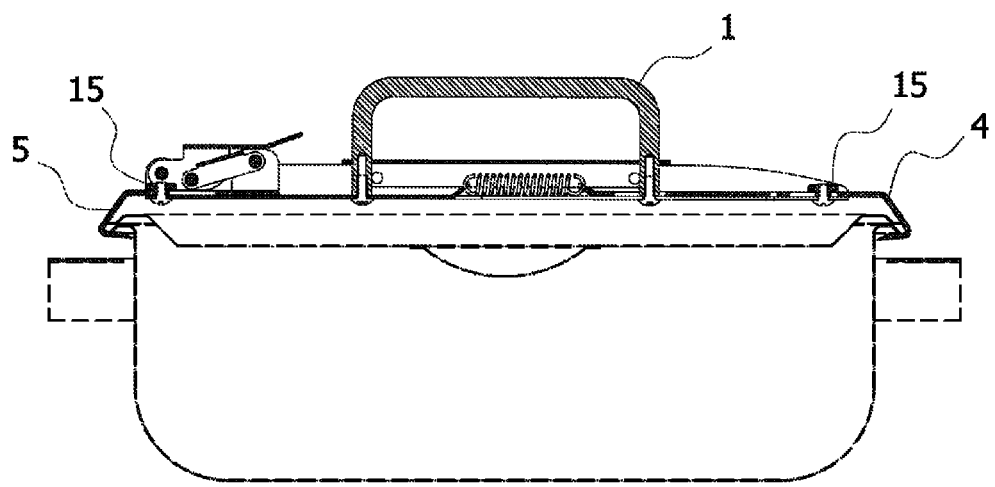
FIG. 2 is a cross-section of the pan handle invention lifting a food pan.

When being transported, the pan is supported by two lifting claws (4,5), one at each end of the lifting device as shown in FIG. 2. The over-center latching mechanism has two extreme positions: the open position (shown in FIG. 5) and the closed or latched position (shown in FIG. 6). When in the open position (FIG. 5), the latched lifting claw (5) is slid away from the spring-loaded lifting claw (4), widening the gap between the two. When fully open, this gap is wide enough to allow the pan handle claws to clear the edges of the pan/lid combination and be lowered into the clamping position. When the latching mechanism is in the closed or latched position (shown in FIG. 6) the gap between the latched lifting claw (5) and the spring-loaded lifting claw is decreased so as to tightly clamp the food pan/lid combination between the claws (4,5). The spring-loading of the opposite lifting claw (4) is provided to allow increased separation between the two lifting claws (4,5) as required to accommodate food pans that are either slightly larger than the nominal dimension and/or to accommodate food pan lids that do not sit flat on the food pan.

Figure 5:
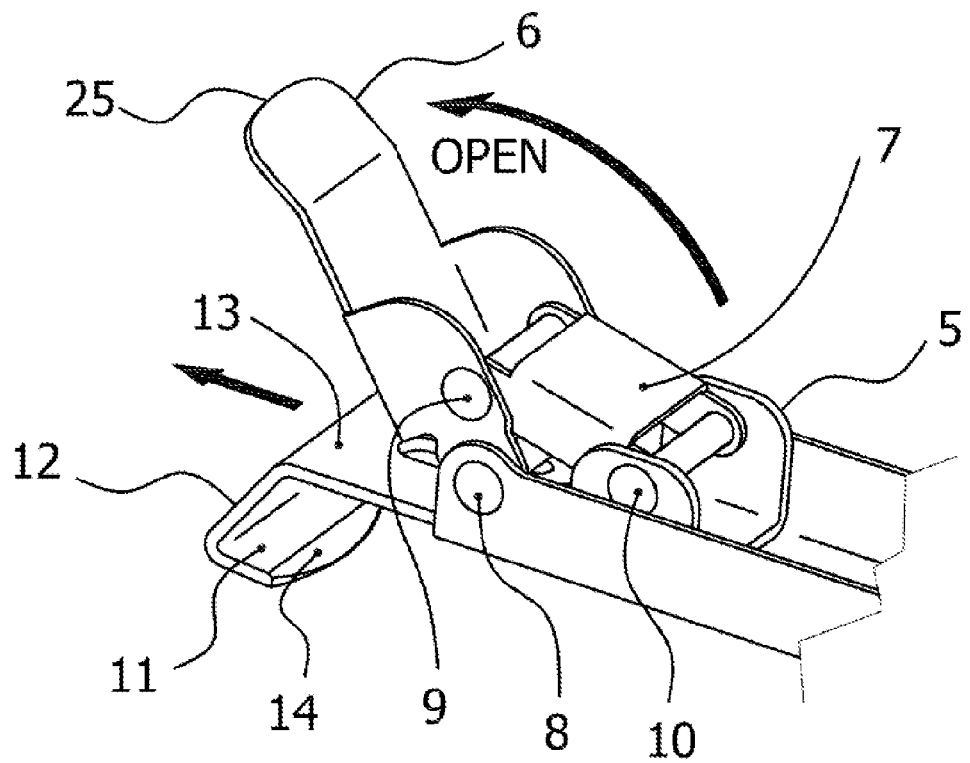
FIG. 5 is a view of the over-center latching mechanism of the latched lifting claw with the lifting claw in the open position.
Figure 6:
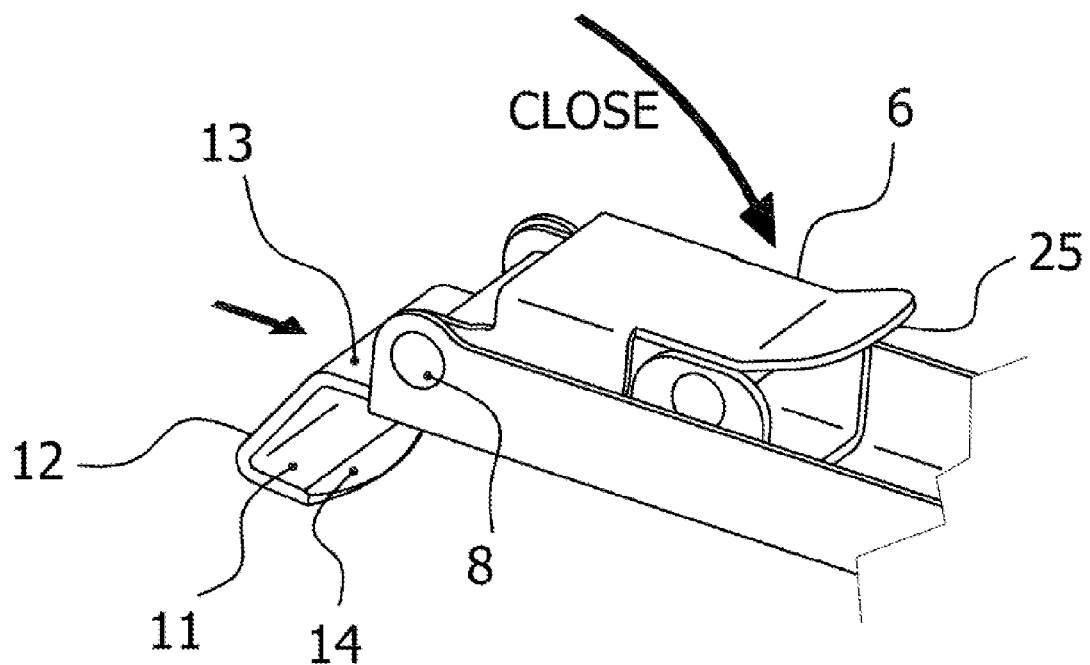
FIG. 6 is a view of the over-center latching mechanism of the latched lifting claw with the lifting claw in the closed position.
Figure 7:
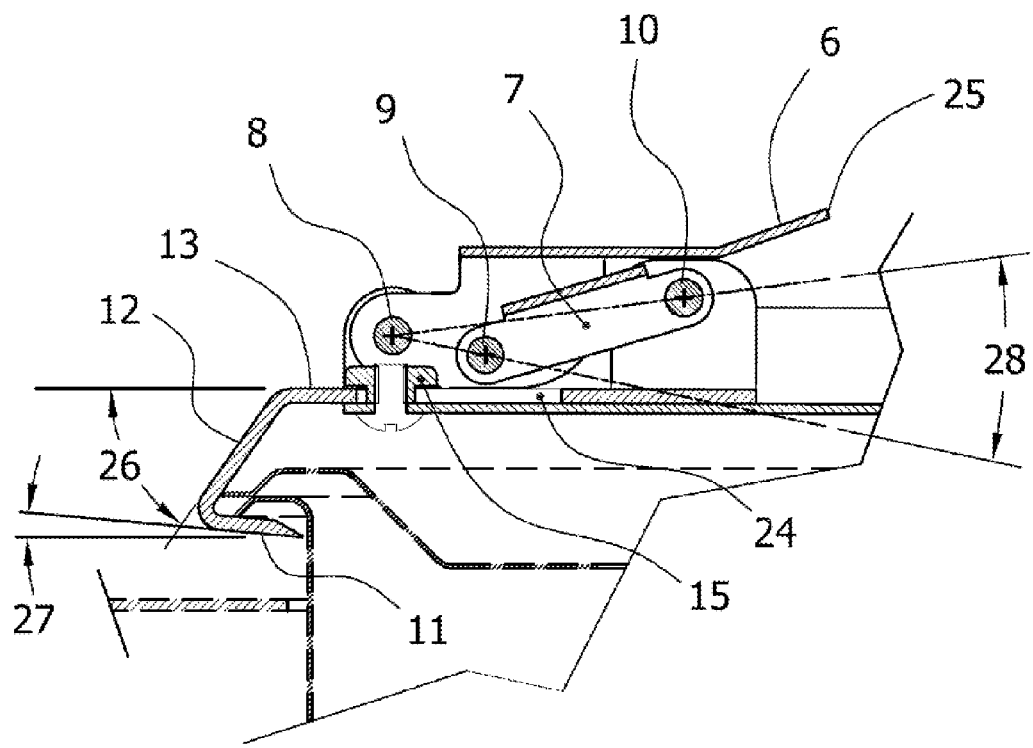
FIG. 7 is a cross-section of the over-center latch showing its geometry.
Figure 8:
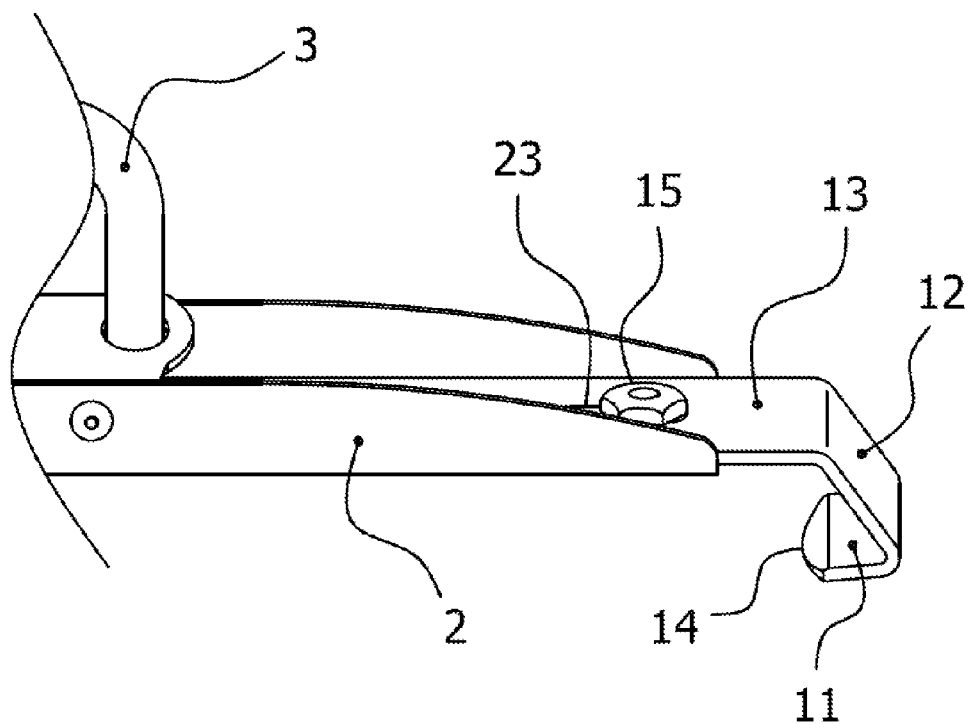
FIG. 8 is a view of the spring-loaded lifting claw.

The lifting claws (4,5) both have three main and common features as shown in FIGS. 5, 6, 7 and 8: the lifting claw tab (11), the angled lid-clamping feature (12) and the horizontal sliding portion (13). The lifting claw tabs (11) are the portions of the claws that the pan lip rests on during lifting. They are sharpened on their inward facing edges (14) to provide a sloped feature for wedging between the food pan edge lip and the warming well top surface. The lifting claw tabs (11) have a lifting tab angle (27) downward from the horizontal (as shown in FIG. 7) to ensure that when the pan handle device (1) is being used to remove a food pan from a warming well that the sharp edge (14) of the tab always slides between the pan's lip and the top of the warming well. As shown in FIGS. 5, 6, 7, 8 the sharpened edges (14) are formed by removing material from the top surface of the lifting claw tabs (11) to ensure that when the device (1) is being used to remove a pan/lid combination from the warming well, that the sharpened edges (14) of the lifting claw tabs (11) always tend to locate themselves at the interface between the warming well and the pan lip such that further inward motion of the claws (4,5) wedges the claws between the two features. The angled lid-clamping feature (12) is the side of the lifting claw that is angled downward from the horizontal sliding feature (13) by angle (26). When the over-center latch lever (6) is closed and the latched lifting claw (5) is tightened into the latched position, the lid-clamping feature (12) on both the latched lifting claw (5) and the spring-loaded lifting claw (4) is angled such that it forces the food pan lid tightly down onto the pan. The sliding feature (13) is the horizontal part of the claw that enables the entire part to slide horizontally on the chassis (2) thus ensuring that the angles of the claw features do not change relative to the pan and lid. The movement of the claws (4,5) are restricted to a single-axis, horizontal movement by a shoulder nut (15) that is fixed to the chassis (2) to eliminate any vertical motion and the inside edges of the chassis (2) which eliminates any sideways motion of the claws (4,5).

Figure 4:
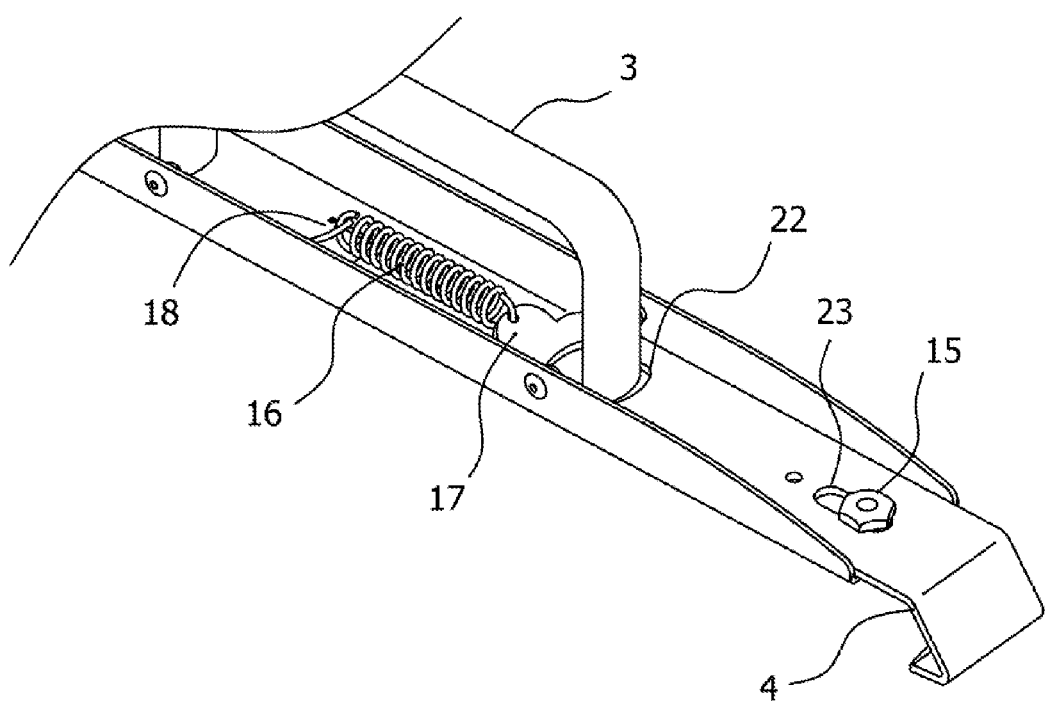
FIG. 4 is a view of the mechanism of the spring-loaded lifting tab with the spring cover removed to illustrate the spring mechanism.

In addition to the common features described in the previous paragraph, the spring-loaded lifting claw (4) is constantly pulled towards the center of the handle by a tension spring (16) which is attached to a point on the inside end of the spring-loaded lifting claw (17) on one end and to an anchor point (18) on the chassis (2) on the other end as shown in FIG. 4. This spring provides the horizontal clamping force of the lifting claws when the over-center latch (5), on the opposite side of the handle mechanism, is in the latched position. There are two slots (22, 23) in the sliding part to accommodate the handle (3) and the shoulder nut (15) respectively which are both fixed relative to the chassis (2). The slots are sized to permit the spring-loaded lifting claw (7) to slide freely.

The over-center draw latch mechanism (shown in FIGS. 5 and 6), which is located on one end of the lifting handle device, provides a mechanism for opening the latched lifting claw (5) through the use of a leveraging system to allow the user to tightly close the over-center latch lever (6) and easily overcome the force of the tension spring (16) on the opposite end of the device. The over-center latch mechanism has a latch lever (6) which is operated by the user levering it open and closed using the lever tip (25) to obtain maximum leverage. The latch lever (6) pivots around a pin (8) that is fixed to the chassis (2). This latch lever (6) has another pivot pin (9) attached to it on which link (7) can pivot freely. The other end of link (7) pivots around another pin (10) that is fixed to the latched lifting claw (5). The link (7) provides a mechanism to convert the rotary motion of the latch lever into the linear sliding motion of the latched lifting claw (5). As shown in FIG. 7, the latched lifting claw (5) is restrained in its movement by a shoulder nut (15) that fits into a longitudinal slot (24) in the horizontal claw feature (13) thus permitting the claw to only slide in a single-axis, longitudinal motion. In this way, when the latch lever (6) is opened and closed, the sliding motion of the latched lifting claw (5) is limited to a single-axis movement as indicated in FIGS. 5 and 6. In addition, when the latch lever (6) is completely closed, the lever-to-link pivot (9) position is located below the line between the other two pivots (8, 10) such that there is an angle (28) between the three pivot points as shown in FIG. 7. Once closed, this over-center mechanism prevents the latch from coming undone from any amount of spreading force between the two lifting claws (4, 5). Any increase in spreading force between the two lifting claws (4, 5) only results in a tighter latching force.

In order to ensure that the user's hands cannot scrape either the edges of the chassis or any part of the spring mechanism below the handle, the lifting device (1) has a spring cover plate (19). This cover plate (19) is a plate which is bent down on its two longitudinal sides and fits inside the vertical sides of the chassis (2). It is fastened into place using several rivets (20). The top surface of the cover plate (19) is slightly higher than the sides of the chassis (2) so as to prevent the user from scraping their hands on the edges of the chassis (2) when inserting or retracting their fingers from the underside of the lifting handle (3).

In order to ensure that the invention is easily cleanable and sanitary, it is made entirely from corrosion resistant materials that can be either routinely washed in a dishwasher or soaked in a chlorinated sanitizing solution. Appropriate corrosion resistant materials may include, but are not limited to, many grades of stainless steels and plastics.

Claw Variation to Accommodate Slotted Lid Version

Figure 9:
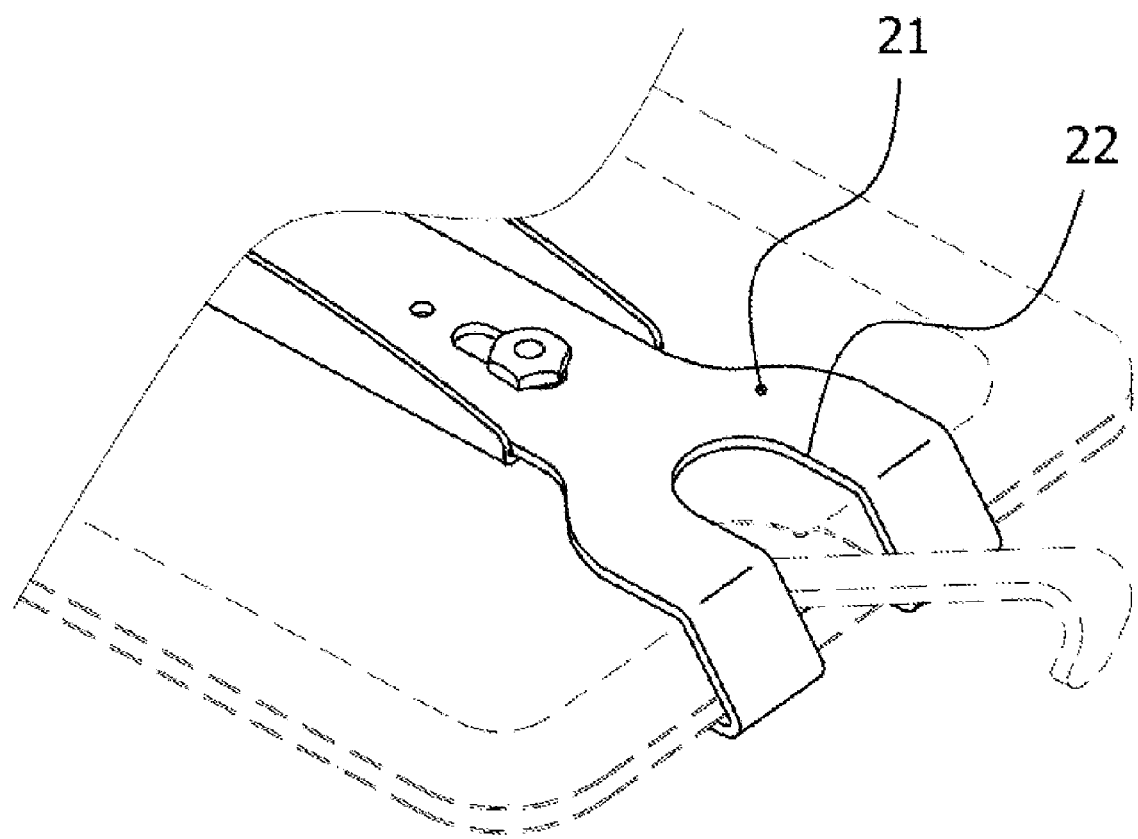
FIG. 9 is a view of an alternate claw for accommodating a ladle or other utensil protruding from the pan.

In addition to the completely closed pan lids, some pan lids have an open-ended slot in the center of one end to allow a serving ladle or other utensil to remain in the pan with the lid in place. As shown in FIG. 9, an alternate claw design (21) may be incorporated to accommodate this type of lid. With this type of lid the alternative claw design (21) is required not only to provide a slot (22) for the ladle to protrude with the pan lifting device (1) centered but also to provide additional width to ensure that the claw has sufficient lid edge to clamp it down to the pan. This alternate claw may be used on either the spring-loaded lifting claw (4) as shown in FIG. 9 or on the latched lifting claw (5).

The embodiments of the invention in which an exclusive property or privilege is claimed are defined as follows:

1. A pan lifting and transportation device comprising:
   a) a chassis extending substantially the length of the device;
   b) a lifting handle that is fixed with respect to the chassis;
   c) a lifting claw on each end of the chassis in which each lifting claw has a portion that is slide-ably attached to the chassis and constrained to move in a direction axial to the length of the chassis, a pan lid-clamping feature that is a portion of the lifting claw that is angled away from the axis of motion of the lifting claw in a direction downwards and away from the center of the device by an angle of between 45° and 90° from the axis of motion, and a lifting claw tab that extends from the lower end of the pan lid-clamping feature and is angled inwards towards the center of the device but downwards and away from the axis of motion of the lifting claw by between 1° and 30° with an inward facing, sharpened edge; and
   d) an over-center latching mechanism connected to the lifting claw on one end which comprises a latch lever pivotally connected to the chassis through one pivoting axis and pivotally connected to a joining link through a second pivoting axis where the joining link is pivotally connected to the axially constrained latching lifting claw through a third pivoting axis such that when the latch lever is opened, the latching lilting claw slides away from the lifting claw on the opposite end of the device, and when the latch lever is fully closed the latching lifting claw is secured such that any forces acting outwardly on the latched lifting claw tends to hold the latch more securely closed in an over-center arrangement.

2. The device in claim 1 in which the lifting claw on the opposite end to the over-center latched lifting claw has a spring-loading mechanism comprising a spring that is attached to the said lifting claw on one end and anchored to a point that is fixed relative to the chassis on the other end such that any forces on the said lifting claw that act outwardly from the center of the device on the lifting claw are resisted by the force of the spring.

3. The device in claim 2 in which the components are comprised of corrosion resistant materials.

4. The device in claim 1 wherein the over-center mechanism in which one or more of the pivots comprises a pin, such as a detent pin, that is removable from the assembly without the use of tools.

5. The device in claim 1 in which at least one lifting claw has a forked feature to accommodate a utensil left in the pan, comprising a slot through the lifting claw extending inwards from the outermost features of the lifting claw.

6. The device in claim 1 in which a lifting tab of at least one lifting claw is comprised of a material that is softer than stainless steel, such as bronze, so as to not scratch warming well surfaces that are made of stainless steel or other scratchable materials.

* * * * *